United States Patent Office 3,402,246
Patented Sept. 17, 1968

3,402,246
m-ALKYLPHENYL N-CHLOROACETYL-N-METHYLCARBAMATES AND THEIR USE AS PESTICIDES
Albert H. Haubein, Newark, Del., assignor to Hercules Incorporated, Wilmington, Del., a corporation of Delaware
No Drawing. Continuation-in-part of applications Ser. No. 458,784, May 25, 1965, and Ser. No. 539,734, Apr. 4, 1966. This application Feb. 27, 1967, Ser. No. 618,992
15 Claims. (Cl. 424—300)

ABSTRACT OF THE DISCLOSURE

The compounds are of the class of substituted-phenyl carbamates, useful as insecticides. A representative compound is m-isopropylphenyl N-chloroacetyl-N-methylcarbamate.

---

This application is a continuation-in-part of copending application Ser. No. 458,784, filed May 25, 1965, now abandoned, and of copending application Ser. No. 539,734, filed Apr. 4, 1966, now abandoned.

This invention relates to new compositions of matter. More particularly, it relates to m-alkylphenyl N-chloroacetyl-N-methylcarbamates and to their use as pesticides.

It has been found in accordance with the present invention that m-alkylphenyl N-chloroacetyl-N-methylcarbamates which conform to the structural formula:

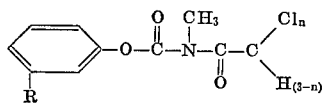

wherein R represents a lower alkyl radical and $n$ represents the integer 1, 2 or 3, are new compounds which are highly toxic to insects contacted therewith and are relatively nontoxic to mammals. The term "lower alkyl" includes all alkyl groups containing from 1 to 5 carbon atoms, i.e., the methyl, ethyl, n-propyl, isopropyl, n-butyl, sec-butyl, isobutyl, t-butyl and the several amyl radicals, including the normal, secondary normal, primary iso, secondary iso and tertiary amyl radicals. Accordingly, the N-chloroacetyl-, N-dichloroacetyl-, and N-trichloroacetyl-N-methylcarbamates containing the following substituted-phenyl moieties are included as pesticidally active compounds within the scope of the present invention: m-methylphenyl, m-ethylphenyl, m-normalpropylphenyl, m-isopropylphenyl, m-normalbutylphenyl, m-secondarybutylphenyl, m-isobutylphenyl, m-tertiarybutylphenyl and the various m-amylphenyl moieties.

These chloroacetyl-N-methylcarbamates may be prepared by effecting reaction between a metal salt of the m-alkylphenyl N-methylcarbamate and the appropriate acid chloride (Stefanye et al., J. Am. Chem. Soc., vol. 77 (1955), pages 3663–4). They also may be prepared by reaction of the m-alkylphenyl chlorocarbonate with the appropriate N-methyl chloroacetamide. Furthermore, the m-alkylphenyl N-chloroacetyl-N-methylcarbamates can be prepared from the corresponding N-methylcarbamate and chloroacetic anhydride. The preferred method, however, comprises heating the appropriate m-alkylphenyl N-methylcarbamate with the corresponding substituted acetyl chloride, in which reaction hydrogen chloride is evolved. An inert solvent of suitable boiling range, such as toluene or xylene, may be utilized, if desired. The temperature of this reaction should be sufficiently high to cause hydrogen chloride formation but not so high as to cause product decomposition. A preferred reaction temperature range is from about 100° C. to about 140° C. Preparation of the subject compounds is illustrated by the examples which follow, all parts and percentages specified being by weight.

Example 1.—m-Methylphenyl N-chloroacetyl-N-methylcarbamate (Compound 1)

Reaction between 135 parts of m-methylphenyl N-methylcarbamate and 123 parts of chloroacetyl chloride was effected at 130° C. until no more hydrogen chloride evolved (about 24 hours). The product was vacuum distilled at a pot temperature of 80° C. and a pressure of 0.5 mm. to remove unreacted chloroacetyl chloride. Recrystallization of the residue from a benzene-hexane solution yielded 104 parts of gray crystals analyzing 14.5% Cl, the theoretical value for m-methylphenyl N-chloroacetyl-N-methylcarbamate being 14.6%. A second recrystallization, this time from benzene, gave white crystals melting at 94–96° C.

Example 2.—m-Isopropylphenyl N-chloroacetyl-N-methylcarbamate (Compound 2)

A mixture of 80 parts m-isopropylphenyl N-methylcarbamate and 53 parts chloroacetyl chloride was heated at 100° C. to 130° C. until the cessation of evolution of hydrogen chloride gas was observed. Excess chloroacetyl chloride was removed by vacuum distillation at 0.8 mm. pressure and a pot temperature which reached 80° C. The dark liquid residue which remained comprised 106 parts m-isopropylphenyl N-chloroacetyl-N-methylcarbamate, and analyzed 14.4% Cl and 5.2% N, compared to theoretical values of 13.2% and 5.2% respectively. By infrared absorption analysis, the product was found also to contain only a small amount (1.7%) of unreacted m-isopropylphenyl N-methylcarbamate.

Example 3.—m-Isopropylphenyl N-dichloroacetyl-N-methylcarbamate (Compound 3)

Reaction of a mixture of 19 parts m-isopropylphenyl N-methylcarbamate and 30 parts of dichloroacetyl chloride was effected as in Example 2. Distillation to remove excess dichloroacetyl chloride was carried out at 0.5 mm. pressure and a pot temperature which reached 100° C. The product, comprising 30 parts m-isopropylphenyl N-dichloroacetyl-N-methylcarbamate, contained less than 2% m-isopropylphenyl N-methylcarbamate by infrared absorption analysis and analyzed 23.6% Cl, the theoretical value being 23.4%.

Example 4.—m-Isopropylphenyl N-trichloroacetyl-N-methylcarbamate (Compound 4)

A mixture of 19 parts m-isopropylphenyl N-methylcarbamate and 36 parts trichloroacetyl chloride was treated in accordance with the method used in Example 3. The product comprised 31 parts m-isopropylphenyl N-trichloroacetyl-N-methylcarbamate and contained 2.7% m-isopropylphenyl N-methylcarbamate as determined by infrared absorption analysis. It analyzed 28.8% Cl, 31.1% Cl being the theoretical value.

Example 5.—m-Tertiarybutylphenyl N-chloroacetyl-N-methylcarbamate (Compound 5)

The method employed in Example 2 was followed. Reaction of 117 parts of m-tertiarybutylphenyl N-methylcarbamate with 85 parts of chloroacetyl chloride resulted in 162 parts of a dark liquid analyzing 14.1% Cl, 12.5% being the theoretical value.

Example 6.—m-Tertiarybutylpheny N-dichloroacetyl-N-methylcarbamate (Compound 6)

Following the procedure of Example 2, reaction of 23 parts of m-tertiarybutylphenyl N-methylcarbamate with 24 parts of dichloroacetyl chloride was carried out. The yellow liquid product, amounting to 34 parts, analyzed for 20.6% chlorine, the theoretical amount being 22.2%. The product contained 1.4% of the original N-methylcarbamate used as reactant, as determined by infrared absorption analysis.

Example 7.—m-Tertiarybutylpheny N-trichloroacety-N-methylcarbamate (Compound 7)

The procedure of Example 2 was used for the reaction of 21 parts of m-tertiarybutylphenyl N-methylcarbamate with 27 parts of trichloroacetyl chloride. There was obtained 32 parts of tan liquid product, which analyzed for 28.0% chlorine. The theoretical value is 29.2% chlorine. Analysis of the product by infrared absorption showed the presence of 3.1% m-tertiarybutylphenyl N-methylcarbamate.

Example 8.—m-Amylphenyl N-chloroacetyl-N-methylcarbamate (Compound 8)

m-Amylphenol in an amount of 16.4 parts was dissolved in 65 parts of toluene. The m-amylphenol was a mixture of isomers, the mixture containing 75% m-(1-methylbutyl)phenol and 25% m-(1-ethylpropyl)phenol. To the resulting solution was added a small amount of stannous octoate. There then was added with stirring a solution of six parts of methylisocyanate dissolved in 8.7 parts of toluene. This reaction mixture was heated at 70° C. for six hours, after which the toluene solvent was removed and the residue topped by distillation at 80° C. under a pressure of 0.1 mm. The pale yellow, liquid product remaining as residue amounted to 21.9 parts. It analyzed for 6.1% introgen, the theoretical amount for m-amylphenyl N-methylcarbamate being 6.34%. The infrared absorption spectra was consistent with a meta-substituted phenyl N-methylcarbamate.

The 21.9 parts of the above carbamate and 17 parts of chloroacetyl chloride was heated to reflux while slowly sparging with nitrogen. As the reaction proceeded, the pot temperature at reflux increased but was not allowed to exceed 130° C. Heating was continued until little hydrogen chloride could be detected in the off-gas. The reaction mixture then was topped at 100° C. and 0.1 mm. pressure to remove excess chloroacetyl chloride. The dark liquid product remaining as residue amounted to 30.2 parts and analyzed 12.6% chlorine, the theoretical amount of m-amylphenyl N-chloroacetyl-N-methylcarbamate being 11.9%. The product contained less than 2% of the original N-methylcarbamate used as reactant, as determined by infrared absorption analysis.

Biological tests, performed using aqueous dispersions of the subject compounds as insecticide sprays, have demonstrated that these carbamates are toxic to a variety of undersirable pests. The sprays employed were prepared by adding to solutions comprised of about equal parts of active compound, benzene, and Tween 20 (a sorbitol monolaurate polyoxyethylene derivative), sufficient quantities of distilled water to result in aqueous disperisions of various toxicant concentrations.

Employing such sprays, high levels of mortality were produced in the following pests subjected to the various toxicants at the concentrations indicated:

Each of compounds 1, 2, 3, 4 and 5, was effective when used at a concentration of 1% against Southern armyworms. In addition, compound 2 was an effective systemic against this pest at concentrations of 0.005% and lower.

Compounds 2, 3 and 4 produced high mortality in pea aphids, the former two toxicants being used at an 0.5% concentration level, the remaining compound being employed at 0.05%. Against houseflies, compounds 2 and 4 proved highly fatal when applied as a spray containing 0.5% of toxicant. Compound 5 was, however, especially effective against this insect, a 0.1% concentration causing a similar degree of mortality.

Mexican bean beetles were particularly susceptible to compounds 1, 4 and 6, a 0.005% concentration of these compounds being capable of producing a very high proportion of fatalities. Use of compound 2 at a 1% concentration level affected Mexican bean beetles similarly. While at the same 1% concentration compound 2 was also highly fatal to two-spotted mites, compound 3 was found to be much more toxic to that pest, producing high mortality in two-spotted mites at 0.1% and even lower concentrations. The effectiveness of compounds 2 and 3 against the blue tick, compounds 3 and 4 against the German cockroach, and compounds 1 and 6 against the plum curculio was also observed.

Furthermore, all of compounds 1 through 8 exhibited activity against corn rootworm larvae. Particularly outstanding are compounds 2 and 5, both of which gave 100% mortality at a concentration of 0.025%. Both of these compounds also were highly active at 0.01% concentration, and compound 2 gave 100% kill even at 0.005% concentration. In addition to this utility against corn rootworm larvae, the compounds of this invention are exceptionally active as insecticides for the control of adult mosquitoes.

To be classified as a good adult mosquitocide, a compound should not only demonstrate a high degree of initial toxicity, but also toxicity which persists at a relatively undiminished level for a period of days or preferably weeks. The test method used to demonstrate the outstanding initial and residual toxicity of the present chloroacetyl-N-methylcarbamates, and the data obtained, are given in the following example.

Example 9

An aqueous emulsion containing 0.25% of the toxicant to be tested was pipetted into a nonporous unwaxed paper cup in an amount sufficient to cover the surface thereof with either 10 mg. or 25 mg. of toxicant per square foot; which emulsion was spread all over the inner surface until dry. The treated cups were allowed to stand open for one to three days at ambient conditions of about 78° F. and 50% relative humidity. Ten female, unfed, adult mosquitoes, anesthetized with $CO_2$, were placed on an 18-mesh stainless steel wire screen and covered by a treated cup, the screen being open to the atmosphere. The mosquitoes revived in a few minutes and were allowed to walk on the walls of the cup for about one hour. They were again anesthetized with $CO_2$ and were placed into a 5-inch circular cage of 14-mesh stainless steel and given food and water. The percent dead after 24 hours was then determined. A fresh group of mosquitoes was placed in the same cup a number of days later and the toxic effect again determined as above. This procedure was repeated at various time intervals until an appreciable drop in toxicity was noted. The following data were recorded:

been found to be suitable. An example of an application in which a solvent solution can be used directly is where

ADULT MOSQUITO TEST

| Compound No. | Toxicant Concentration (mg./sq. ft.) | Weeks (after treatment of cup) | | | | | | | | | | | | | | | | | | |
|---|---|---|---|---|---|---|---|---|---|---|---|---|---|---|---|---|---|---|---|---|
| | | 1 | 2 | 3 | 4 | 5 | 6 | 7 | 8 | 9 | 10 | 11 | 12 | 13 | 14 | 15 | 16 | 17 | 18 | 19 | 20 |
| | | Percent Kill | | | | | | | | | | | | | | | | | | | |
| 1 | 50 | 100 | 80 | 100 | 100 | 90 | 100 | 09 | 90 | 100 | 80 | 60 | | | | | | | | | |
| | 25 | 100 | 90 | 100 | 80 | 100 | 100 | 50 | | | | | | | | | | | | | |
| | 10 | 100 | 10 | | | | | | | | | | | | | | | | | | |
| 2 | 50 | 100 | 100 | 100 | 100 | 100 | 100 | 100 | 100 | 100 | 100 | 100 | 100 | 100 | 100 | 100 | 100 | 100 | 50 | 90 | 90 |
| | 25 | 100 | 100 | 100 | 100 | 100 | 100 | 100 | 100 | 100 | 100 | 100 | 90 | 100 | 100 | 100 | 100 | 50 | | | |
| | 10 | 100 | 100 | 100 | 100 | 100 | 100 | 100 | 100 | 100 | 100 | 5 | | | | | | | | | |
| | 5 | 100 | 100 | 100 | 100 | 80 | 40 | 90 | 90 | 80 | 80 | 10 | | | | | | | | | |
| 3 | 25 | 100 | 100 | 100 | 100 | 10 | | | | | | | | | | | | | | | |
| | 10 | 100 | 20 | | | | | | | | | | | | | | | | | | |
| 4 | 50 | 100 | 100 | 100 | 100 | 100 | 100 | 100 | 100 | 100 | 100 | 100 | 100 | 100 | 90 | 90 | 100 | 100 | 100 | 90 | 50 |
| | 25 | 100 | 70 | 50 | | | | | | | | | | | | | | | | | |
| | 10 | 100 | 0 | | | | | | | | | | | | | | | | | | |
| 5 | 50 | 100 | 100 | 100 | 100 | 100 | 100 | 100 | 100 | 100 | 100 | 100 | 100 | 100 | 100 | 100 | 100 | 100 | 100 | 100 | 100 |
| | 25 | 100 | 100 | 100 | 100 | 100 | 100 | 100 | 100 | 100 | 100 | 100 | 100 | 100 | 100 | 100 | 100 | 100 | 50 | 90 | 30 |
| | 10 | 100 | 100 | 100 | 100 | 100 | 100 | 100 | 90 | 80 | 20 | | | | | | | | | | |
| 6 | 50 | 100 | 100 | 100 | 100 | 100 | 90 | 90 | 100 | 100 | 80 | 50 | 100 | 100 | 100 | | | | | | |
| | 25 | 100 | 100 | 100 | 100 | 100 | 10 | | | | | | | | | | | | | | |
| | 10 | 100 | 50 | | | | | | | | | | | | | | | | | | |
| 7 | 50 | 100 | 90 | 100 | | 100 | 100 | 20 | | | | | | | | | | | | | |
| | 25 | 100 | 20 | | | | | | | | | | | | | | | | | | |
| 8 | 25 | 100 | 100 | 100 | 100 | 90 | 80 | 90 | 100 | 100 | 100 | | | | | | | | | | |
| | 10 | 60 | 80 | 90 | 20 | | | | | | | | | | | | | | | | |

Ideally, pesticidal compounds will be relatively harmless to mammals and yet highly toxic to undesirable pests. Acute oral toxicity to white rats is a measure of harm to mammals, such toxicity often being expressed in terms of $LD_{50}$ values. The $LD_{50}$ value assigned to a compound expresses the amount of that compound, in mg. per kg. of body weight, which will be a lethal dose to 50% of the animals tested, a high $LD_{50}$ value indicating a low (favorable) mammalian toxicity since a large dose is required. The table below presents approximate $LD_{50}$ values as determined with white rats for seven of the compounds of this invention and for DDT. It can be seen that mammalian toxicities of the instant compounds tested are more favorable than that of DDT, and that compounds 1, 2, 3 and 5, in particular, are highly suitable for use proximate to mammals.

Acute oral toxicity to white rats

| Compound: | $LD_{50}$ (mg./kg.) |
|---|---|
| 1 | >800 |
| 2 | >400 |
| 3 | 370 |
| 4 | 140 |
| 5 | 490 |
| 6 | 155 |
| 7 | 118 |
| DDT | 113 |

The compounds of the present invention may be employed alone in pesticidal formulations as the sole toxicants thereof, or mixtures of the compounds may be so used. Also, the properties of these compounds may be modified by employing them in admixture with other toxicants such as toxaphene, DDT, Thanite, Chlordane, rotenone, pyrethrum, and the like.

These carbamates are applied according to any of the methods suitable for pesticide application, for example, as solvent solutions or in combination with solid or liquid extenders or adjuvants. Suitable solvents for the preparation of solvent solutions, which may either be used directly or after dispersion in an immiscible liquid or on a solid carrier, include pine oil, alcohols, hydrocarbon solvents such as xylene, methylated naphthalene, and isophorone, difluorodichloromethane, deodorized kerosene, cyclohexanone, methyl isobutyl ketone, and other similar organic solvents. When such a solvent solution is to be used directly, the concentration of toxicant contained therein may range from about 10% to about 90% based on the weight of the solution. Otherwise, the toxicant concentration in solution will be adjusted so that upon further dilution the desired ultimate concentration results. Amounts of toxicant ranging from about 0.1% to about 10% by weight of the diluted formulation have generally been found to be suitable. An example of an application in which a solvent solution can be used directly is where the toxicant is employed in an aerosol formulation, in which case difluorodichloromethane or a similar aerosol propellant functions, both as the solvent and as the propellant vehicle.

In many instances it will be most advantageous, for reasons of economy, facility of application, etc., to employ these pesticides in admixture with solid or nonsolvent liquid extenders. Such extenders include water and solid carrier materials, preferably those that are readily available and inexpensive, such as talc, attapulgite, natural clays, pyrophylite, diatomaceous earth, kaolin, aluminum and magnesium silicates, montmorillonite, and similar substances such as are used as carriers in the insecticide and herbicide arts. Using such solid materials as extenders, wettable powders and dusts may be formulated. In many instances, the extenders envisioned for use in this invention will themselves possess surface-active properties, in which case they may properly be termed dispersants. In other instances, such as when water is used, the extender possesses no surface-active properties of its own, and an additional material will be added to aid in the dispersion of the toxicant throughout the extender. It should be realized that while it is generally advantageous to distribute as uniformly as possible the toxic substances over surfaces to which the pesticides are applied, through the use of surface-active agents when necessary, there may be circumstances under which it is desired to omit such agents; such cases are also intended to be within the scope of this invention. Toxicant concentrations in these extended formulations may vary within wide limits; suitable concentrations for application in the field range from about 0.01% to about 20% of toxicant based on the total weight of formulation.

The aqueous dispersions contemplated herein comprise a compound of this invention, water and a surface-active dispersing agent. Ordinarily an aqueous dispersion will be made up from a concentrate comprised of the toxic compound and a surface-active agent, which concentrate will subsequently be dispersed in water to a desired concentration. The amount of toxic compound contained in a spray properly diluted for application in the field will generally range from about 0.01% to about 20% of such an aqueous dispersion. In most instances, the amount of surface-active agent used will be from about 1% to about 25% of the amount of toxicant present. Organic solvents may also be contained in the concentrate to aid in effective dispersion.

Suitable surface-active dispersing agents for use in the compositions of this invention are those disclosed in Chemistry of Insecticides, Fungicides, and Herbicides (Donald E. H. Frear, second edition (1948), pages 280-287), for use with known insecticides. They include neutral soaps of resin, alginic, and fatty acids, with alkali metals, alkyl-amines or ammonia; saponins, gelatins, milk, soluble casein, flour and soluble proteins thereof, sulfite lye, lignin pitch, sulfite liquor, long-chain fatty alcohols having 12–18 carbon atoms and alkali metal salts of the sulfates thereof, salts of sulfated fatty acids, salts of sulfonic acids, esters of long-chain fatty acids and polyhydric alcohols in which alcohol groups are free, solid dispersants such as fuller's earth, China clay, kaolin, attapulgite, and bentonite and related hydrated aluminum silicates having the property of forming a colloidal gel. Among the other surface-active dispersing agents which are useful in the compositions of this invention are the omega-substituted polyethylene glycols of relatively long chain length, particularly those in which the omega substituent is aryl, alkyl, or acyl.

Compositions of the toxic material and surface-active dispersing agent will in some instances have more than one surface-active dispersing agent for a particular type of utility. For example, the toxic material may contain surface-active clay as the sole adjuvant or clay and another surface-active dispersing agent to augment the dispersing action of the clay. Similarly, as is hereinbefore described, the toxic material may have water admixed therewith along with a surface-active dispersing agent, most often the amount of water added being sufficient to form an emulsion. All of these compositions comprising toxic compounds and surface-active dispersing agents may contain, in addition, synergists and/or adhesive or sticking agents. Moreover, the recital of specific classes of additives is not intended to limit the scope of this invention thereto, but it is to be understood that the addition of other materials to these formulations is also envisioned.

In using the toxicants of this invention for killing pests, the compounds act by contact therewith, which contact may be direct, as by spraying the insects themselves, and/or indirect, as by contacting the habitats of the insects with the N-chloroacetyl-N-methylcarbamates.

What I claim and desire to protect by Letters Patent is:

1. A pesticidally active composition of matter represented by the structural formula

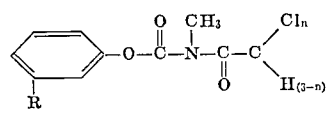

wherein R represents a lower alkyl radical and $n$ represents an integer selected from the group consisting of 1, 2 and 3.

2. A composition in accordance with claim 1 wherein R represents the methyl radical and $n$ represents the integer 1.

3. A composition in accordance with claim 1 wherein R represents the isopropyl radical and $n$ represents the integer 1.

4. A composition in accordance with claim 1 wherein R represents the isopropyl radical and $n$ represents the integer 2.

5. A composition in accordance with claim 1 wherein R represents the isopropyl radical and $n$ represents the integer 3.

6. A composition in accordance with claim 1 wherein R represents the tertiarybutyl radical and $n$ represents the integer 1.

7. A composition in accordance with claim 1 wherein R represents the tertiarybutyl radical and $n$ represents the integer 2.

8. A composition in accordance with claim 1 wherein R represents the tertiarybutyl radical and $n$ represents the integer 3.

9. A composition in accordance with claim 1 wherein R represents an amyl radical and $n$ represents the integer 1.

10. A composition capable of pesticidal activity when dispersed comprising a compound of claim 1 in admixture with a surface-active dispersant.

11. A composition capable of pesticidal activity comprising a compound of claim 1 dissolved in a solvent therefor.

12. A composition capable of pesticidal activity comprising a minor amount of a compound of claim 1 and a major amount of water.

13. A composition capable of pesticidal activity comprising a minor amount of a compound of claim 1 and a major amount of a solid carrier material.

14. The method of killing insects which comprises contacting said insects with a toxic amount of a compound of claim 1.

15. The method in accordance with claim 14 in which said insects are mosquitoes.

References Cited

UNITED STATES PATENTS

| | | | |
|---|---|---|---|
| 2,306,599 | 12/1942 | Engel et al. | 260—479 XR |
| 2,401,080 | 5/1946 | Kilgore et al. | 167—30 XR |
| 2,520,586 | 8/1950 | Weber et al. | 167—30 XR |
| 2,903,478 | 9/1959 | Lambrech | 260—479 |
| 3,037,993 | 6/1962 | Shulgin | 260—479 XR |
| 3,318,947 | 5/1967 | Speziale et al. | 260—479 XR |

FOREIGN PATENTS

| | | |
|---|---|---|
| 1,381,253 | 11/1964 | France. |
| 852,920 | 11/1960 | Great Britain. |
| 982,235 | 3/1965 | Great Britain. |
| 267,919 | 11/1964 | Australia. |

OTHER REFERENCES

Labrecque et al.: Mosquito News, 20(3): 238–241, September 1960.

Gahan et al.: J. Econ. Entom. 54(1): 63–67, February 1961.

Cole et al.: J. Econ. Entom. 55(1): 98–102, February 1962.

Metcalf et al.: Pest Control 30(6): 20–28, June 1962.

Fraser et al.: J. Sci. Fd. Agric. 16: 615–618, October 1965.

Reay et al.: J. Sci. Fd. Agric. 17: 17–19, January 1966.

LEWIS GOTTS, Primary Examiner.

SHEP K. ROSE, Assistant Examiner.